US009832274B1

(12) United States Patent
Buckley et al.

(10) Patent No.: US 9,832,274 B1
(45) Date of Patent: Nov. 28, 2017

(54) DIRECTORY UPDATE MONITORING SYSTEMS AND METHODS

(71) Applicant: Bluecore, Inc., New York, NY (US)

(72) Inventors: Ryan Buckley, Brooklyn, NY (US); Mahmoud Arram, Brooklyn, NY (US); Joe Guzzardo, New York, NY (US)

(73) Assignee: BLUECORE, INC., New York, NY (US)

( * ) Notice: Subject to any disclaimer, the term of this patent is extended or adjusted under 35 U.S.C. 154(b) by 0 days.

(21) Appl. No.: 15/499,646

(22) Filed: Apr. 27, 2017

(51) Int. Cl.
| G06F 15/173 | (2006.01) |
| H04L 29/08 | (2006.01) |
| G06F 17/30 | (2006.01) |
| H04L 29/06 | (2006.01) |
| H04H 60/64 | (2008.01) |

(52) U.S. Cl.
CPC ........ *H04L 67/22* (2013.01); *G06F 17/30377* (2013.01); *H04H 60/64* (2013.01); *H04L 63/1425* (2013.01); *H04L 67/12* (2013.01); *H04L 67/02* (2013.01)

(58) Field of Classification Search
CPC ..... H04H 60/64; H04L 63/1425; H04L 67/22; H04L 67/02; G06F 17/30377
See application file for complete search history.

(56) References Cited

U.S. PATENT DOCUMENTS

| 7,047,169 | B2 | 5/2006 | Pelikan et al. |
| 8,484,511 | B2 * | 7/2013 | Tidwell .................. H04H 60/64 |
| | | | 707/700 |
| 9,177,059 | B2 | 11/2015 | Musgrove et al. |
| 9,569,439 | B2 | 2/2017 | Davis et al. |
| 9,576,313 | B2 | 2/2017 | Kanigsberg et al. |
| 2011/0313933 | A1 | 12/2011 | Dai et al. |
| 2014/0172767 | A1 | 6/2014 | Chen et al. |
| 2014/0214844 | A1 | 7/2014 | Garera et al. |
| 2014/0214845 | A1 | 7/2014 | Garera et al. |
| 2015/0350849 | A1 | 12/2015 | Huang et al. |
| 2015/0379115 | A1 | 12/2015 | Garera et al. |
| 2016/0241579 | A1 * | 8/2016 | Roosenraad ........ H04L 63/1425 |

OTHER PUBLICATIONS

Hidden Markov Map Matching Through Noise and Sparseness; Paul Newson and John Krumm; Nov. 6, 2009.
Hidden Markov Model; Mohammad; Jan. 30, 2003.
Hidden Markov Model; Shlomo Moran; Oct. 31, 1999.
Hidden Markov model; Wikipedia Page.

* cited by examiner

Primary Examiner — Kyung H Shin
(74) Attorney, Agent, or Firm — AEON Law; Adam L. K. Philipp; Manasi Vakil

(57) ABSTRACT

Disclosed is a method and system for online directory management in which a succession of values is aggregated as human behavior data from client devices visiting a website. A new value is automatically transmitted in response to a correlation signaling that the new value signifies a true mutation.

19 Claims, 12 Drawing Sheets

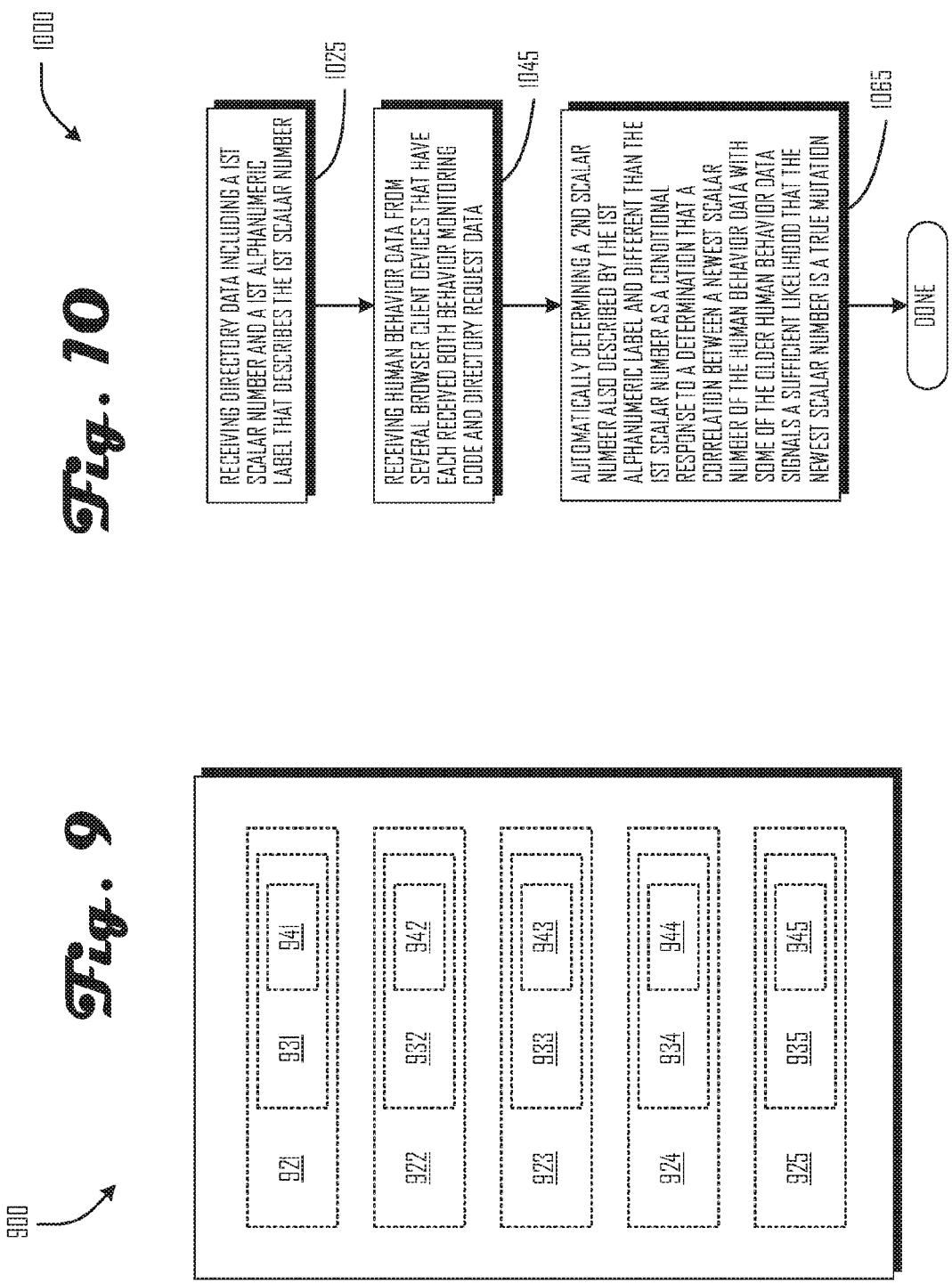

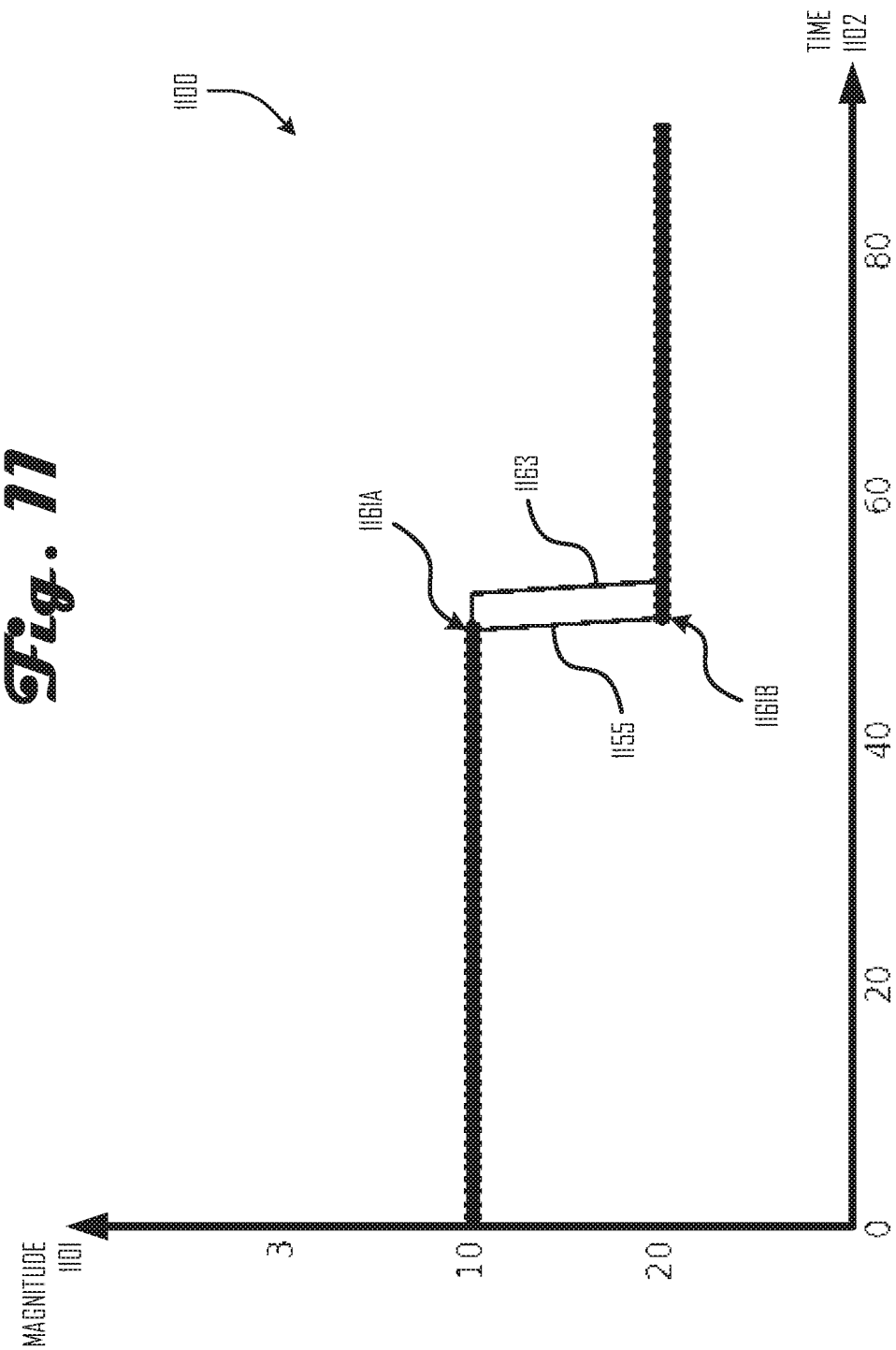

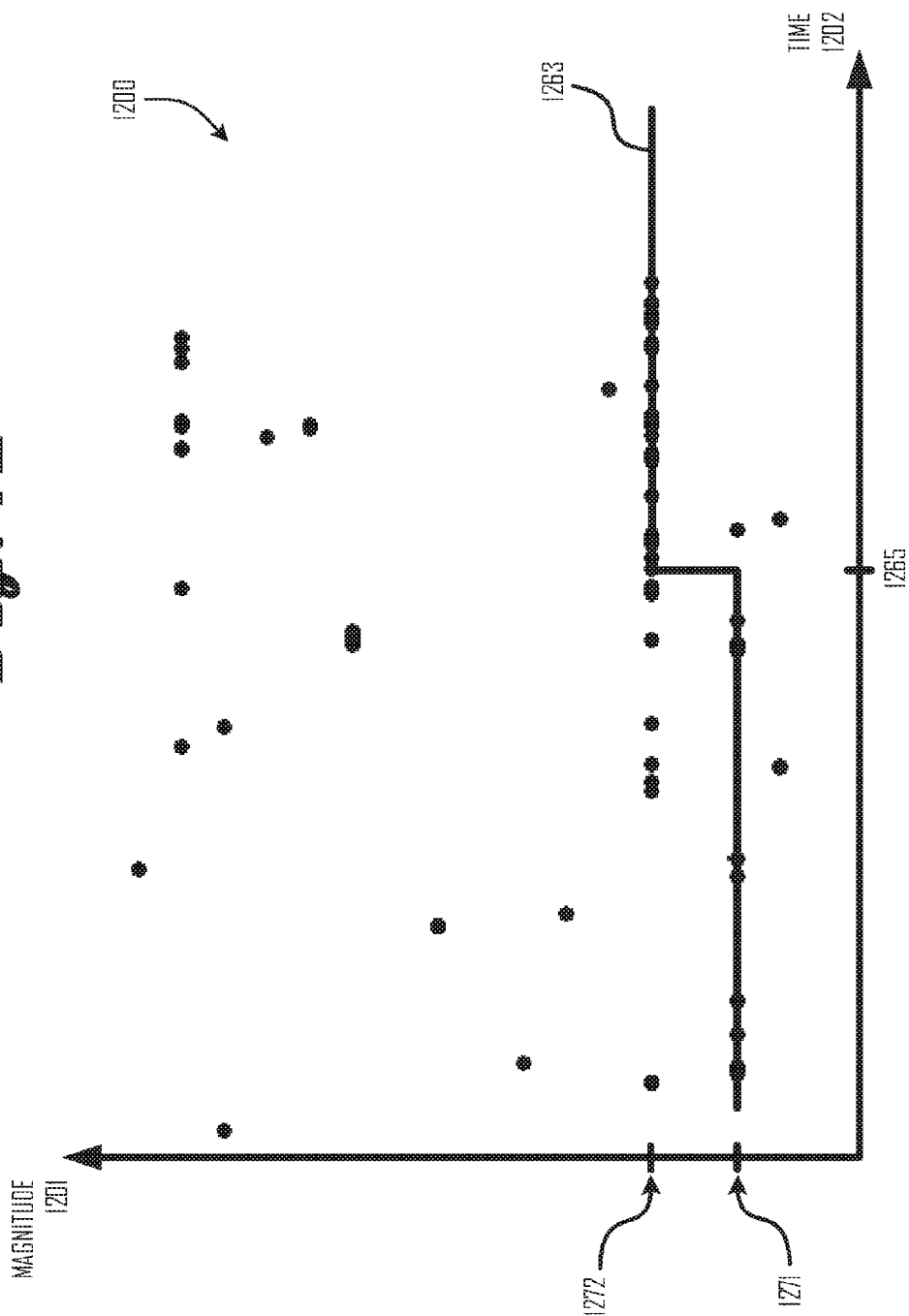

DIRECTORY UPDATE MONITORING SYSTEMS AND METHODS

RELATED APPLICATIONS

None.

BRIEF DESCRIPTION OF THE DRAWINGS

FIG. 9 depicts event-sequencing logic according to one or more embodiments.

FIG. 10 depicts an operational flow according to one or more embodiments.

FIG. 11 depicts a circumstance in which a relatively fast inference of a true mutation is made according to one or more embodiments.

FIG. 12 depicts a circumstance in which a slower inference of a true mutation is made according to one or more embodiments.

DETAILED DESCRIPTION

Figure 1:
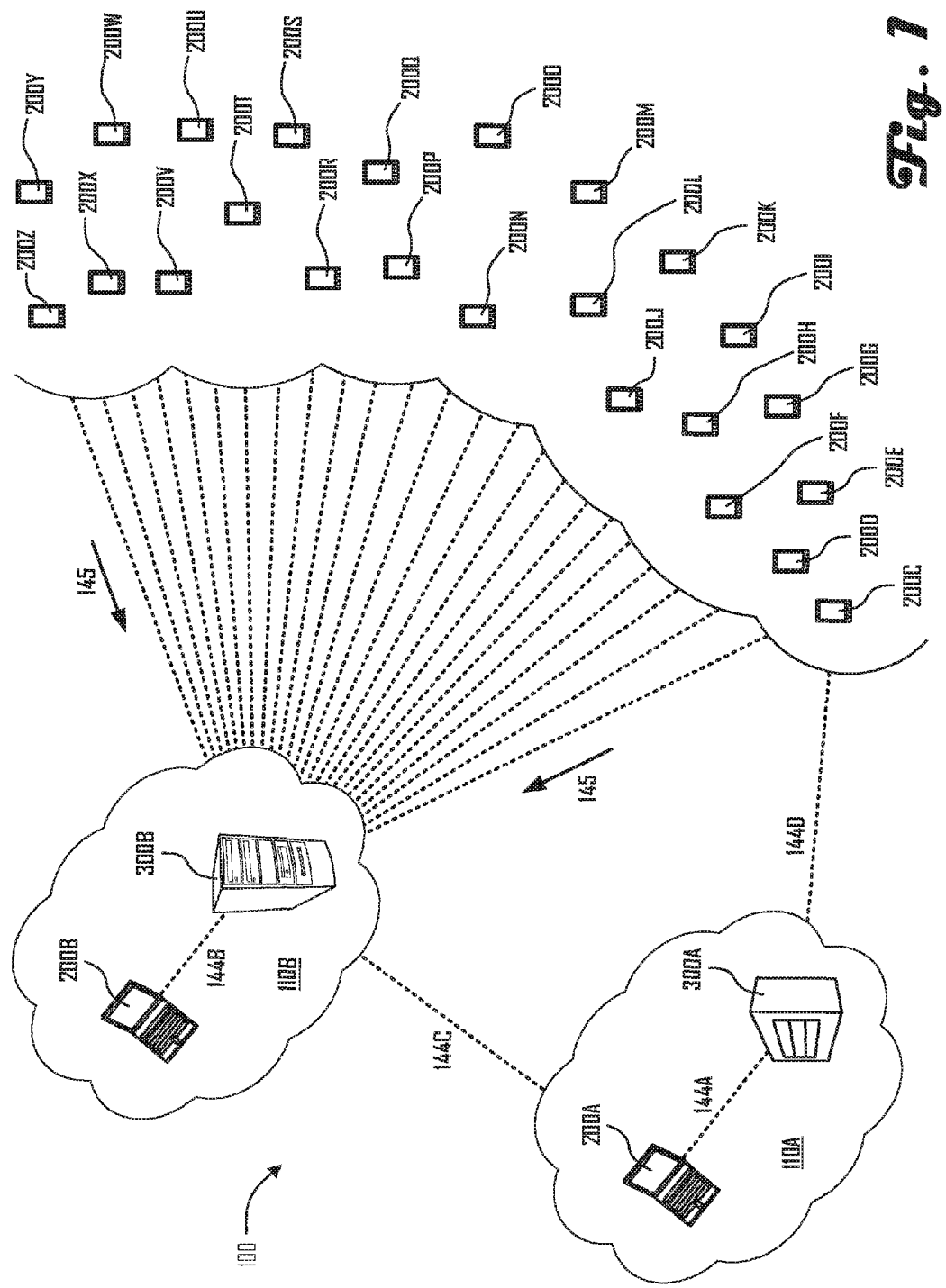
FIG. 1 depicts a system in which respective entities each employ one or more servers according to one or more embodiments.

The detailed description that follows is represented largely in terms of processes and symbolic representations of operations by conventional computer components, including a processor, memory storage devices for the processor, connected display devices and input devices. Furthermore, some of these processes and operations may utilize conventional computer components in a heterogeneous distributed computing environment, including remote file servers, computer servers and memory storage devices.

It is intended that the terminology used in the description presented below be interpreted in its broadest reasonable manner, even though it is being used in conjunction with a detailed description of certain example embodiments. Although certain terms may be emphasized below, any terminology intended to be interpreted in any restricted manner will be overtly and specifically defined as such.

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise.

"Above," "actual," "aggregated," "alphanumeric," "also," "apparent," "as," "associated," "automatic," "based," "before," "below," "caused," "changed," "comprising," "conditional," "configured," "containing," "correlated," "described," "described," "determined," "disclosed," "each," "executable," "first," "for," "found," "fourth," "from," "hidden," "human," "identified," "integrated," "likelier," "likewise," "local," "manifested," "manifesting," "many," "matching," "mixed," "modeled," "monitoring," "more," "multiple," "mutual," "newest," "observed," "older," "particular," "physical," "recent," "remote," "requested," "respective," "responsive," "scalar," "second," "sequential," "set forth," "several," "to," "transmitting," "true," "unique," "updated," "via," "with," or other such descriptors herein are used in their normal yes-or-no sense, not as terms of degree, unless context dictates otherwise. In light of the present disclosure those skilled in the art will understand from context what is meant by "remote" and by other such positional descriptors used herein. Terms like "processor," "center," "unit," "computer," or other such descriptors herein are used in their normal sense, in reference to an inanimate structure. Such terms do not include any people, irrespective of their location or employment or other association with the thing described, unless context dictates otherwise. "For" is not used to articulate a mere intended purpose in phrases like "circuitry for" or "instruction for," moreover, but is used normally, in descriptively identifying special purpose software or structures.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein.

Figure 8:
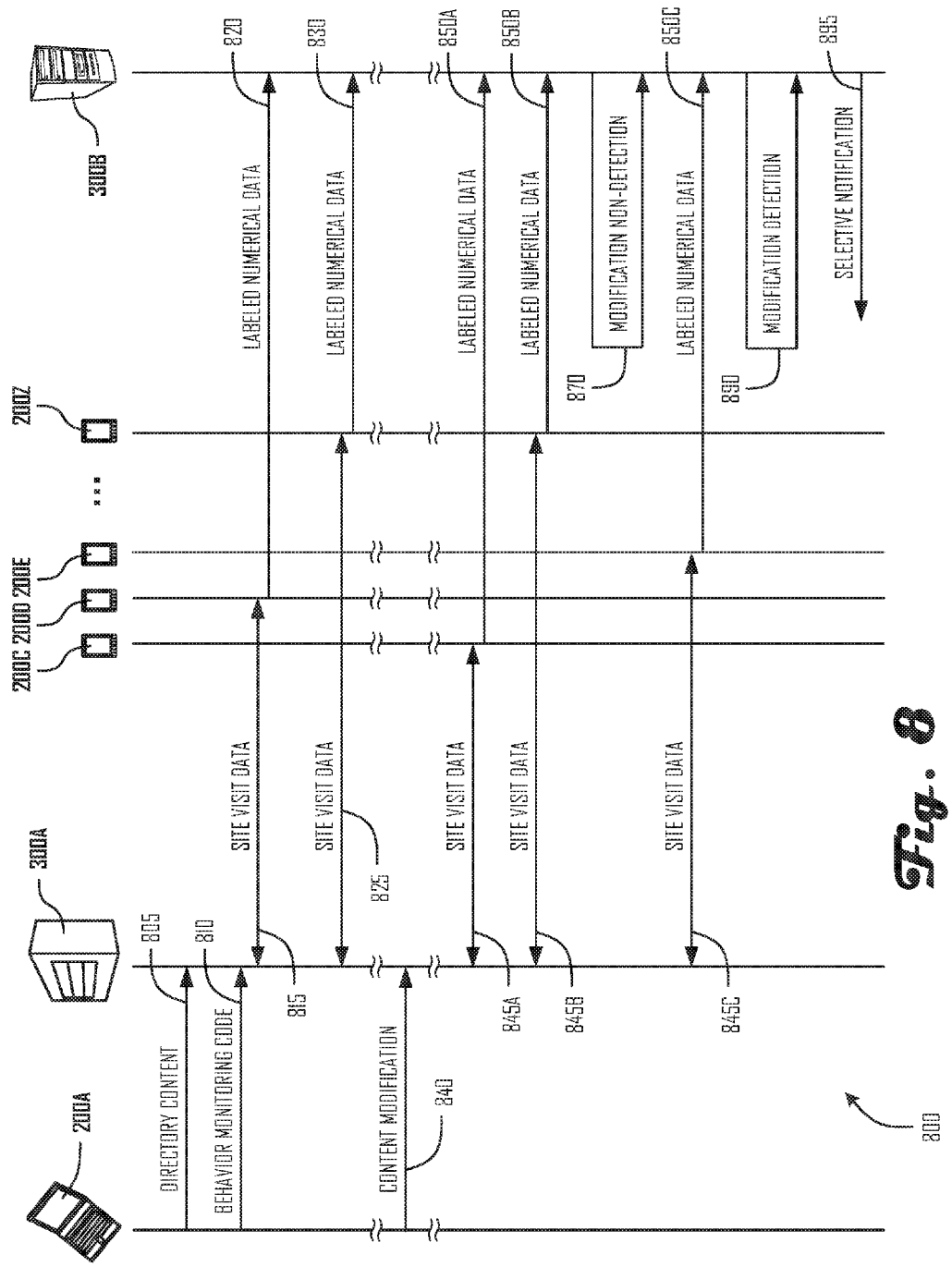
FIG. 8 depicts a data flow according to one or more embodiments.

FIG. 1 schematically illustrates a system 100 in which respective entities 110A-B interact with one another and with numerous client devices 200C-Z most or all of which are, at various times, mutually autonomous visitors to one or more directory websites hosted at server 300A via respective instances of linkage 144D. A first entity 110A comprises one or more servers 300A that interact with one or more supervisory client devices 200A thereof (via respective instances of linkage 144A, e.g.). A second entity 110B comprises one or more servers 300B that interact with one or more supervisory client devices 200B thereof (via respective instances of linkage 144B, e.g.). In some instances the entities 110A-B may cooperate so that updates to values maintained at server 300A are diligently passed along via linkage 144C and so that adequately timely responses to those updates can occur. In other instances, though, slow or incorrect update information may be passed to server 300B via linkage 144C. To maintain better continuity and responsive action, therefore, server 300A may be equipped with behavior monitoring code (as depicted in FIG. 8, e.g.) that is, in response to a suitable user permission, downloaded to some or all of the client devices 200C-Z during the website visit so as to monitor behaviors of the device during the visit (as described below) and thereafter not be maintained at the device. In many contexts this facilitates significant volumes of real-time or other same-day data flow 145 (occurring at most a few hours after the corresponding visit, for example, rather than in a once-nightly batch transmission via linkage 144C).

Figure 2:
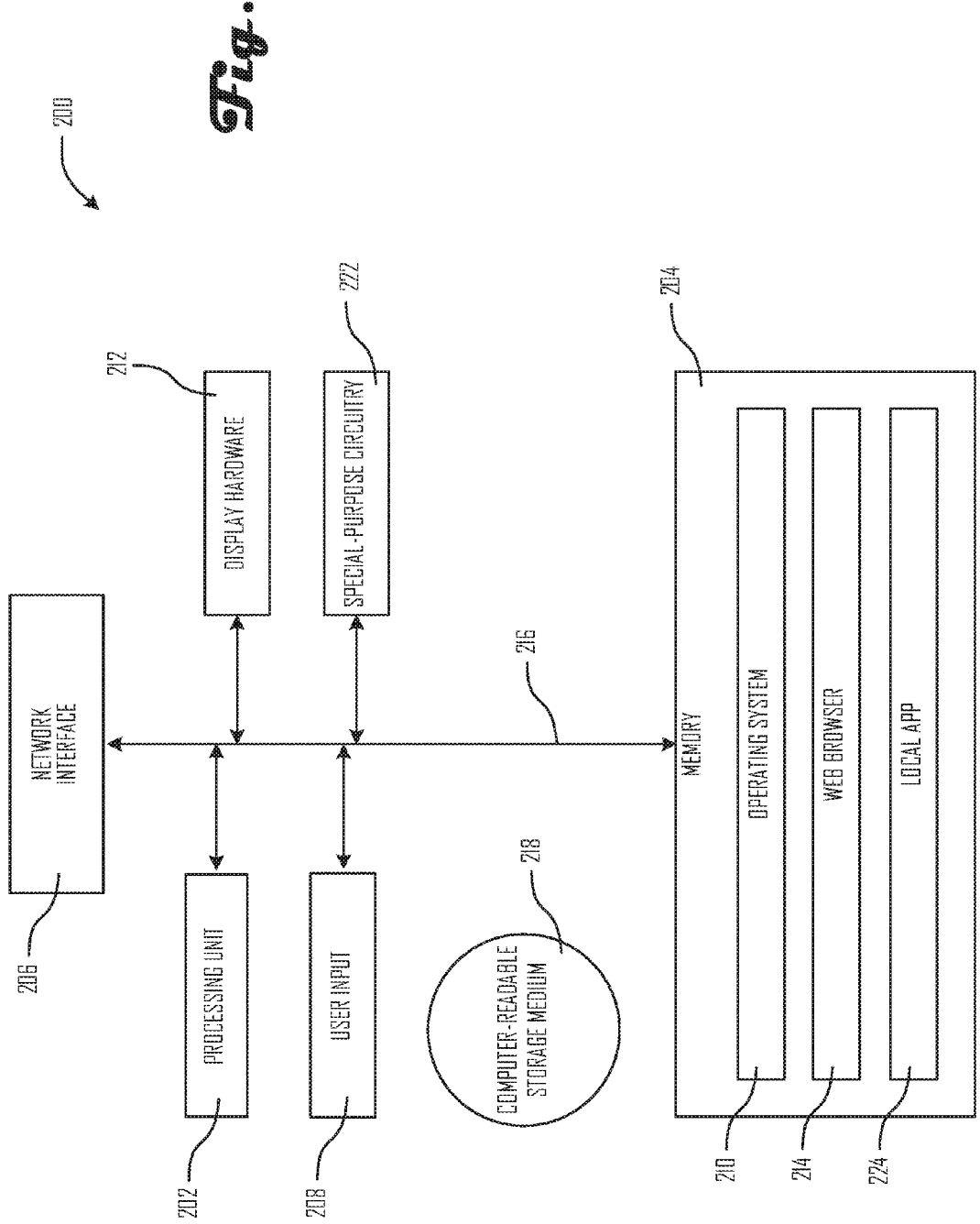
FIG. 2 depicts a network and device diagram illustrating exemplary computing devices configured according to one or more embodiments.

FIG. 2 illustrates several components of an exemplary client device 200 (like those of devices 200A-Z, e.g.). As used herein, a plain reference numeral (like 200, e.g.) may refer generally to a member of a class of items (like client devices, e.g.) exemplified with a hybrid numeral (like 200Q, e.g.) and it will be understood that every item identified with a hybrid numeral is also an exemplar of the class. In some embodiments, client device 200 may include many more components than those shown in FIG. 2. However, it is not necessary that all conventional components be shown in order to disclose an illustrative embodiment. As shown in FIG. 2, client device 200 includes a data network interface 206 (for connecting via the Internet or other networks to or within entities 110 of FIG. 1, e.g.).

Client device 200 may also include one or more instances of processing units 202, memory 204, user inputs 208, and display hardware 212 all interconnected along with the network interface 206 via a bus 216. Memory 204 generally comprises a random access memory ("RAM"), a read only memory ("ROM"), and a permanent mass storage device, such as a disk drive.

Memory 204 may likewise contain one or more instances of operating systems 210, web browsers 214, and local apps 224. These and other software components may be loaded from a non-transitory computer readable storage medium 218 into memory 204 of the client device 200 using a drive mechanism (not shown) associated with a non-transitory computer readable storage medium 218, such as a floppy disc, tape, DVD/CD-ROM drive, flash card, memory card, or the like. In some embodiments, software components may also be loaded via the network interface 206, rather than via a computer readable storage medium 218. Special-purpose circuitry 222 may, in some variants, include some or all of the event-sequencing logic described below (in a peer-to-peer implementation, e.g.).

Figure 3:
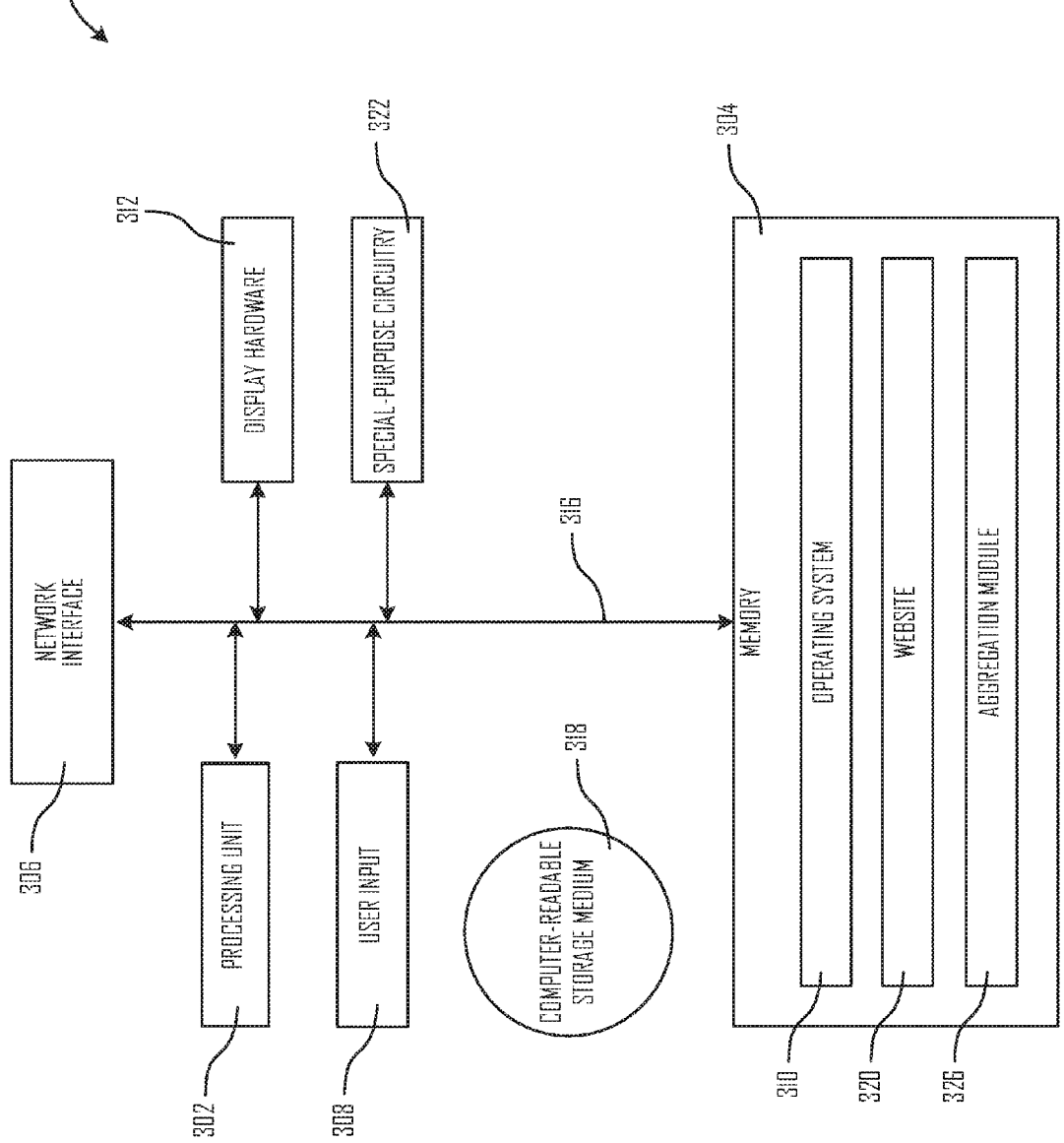
FIG. 3 depicts a server according to one or more embodiments.

FIG. 3 illustrates several components of an exemplary server 300 (like those of servers 300A-B, e.g.). As shown in FIG. 3, server 300 includes a data network interface 306 for connecting via the Internet or other networks (or both) to client devices 200A-Z of FIG. 1.

Server 300 may also include one or more instances of processing units 302, memory 304, user inputs 308, and display hardware 312 all interconnected along with the network interface 306 via a bus 316. Memory 304 generally comprises a random access memory ("RAM"), a read only memory ("ROM"), and a permanent mass storage device, such as a disk drive.

Memory 304 may likewise contain an operating system 310, hosted website 320, and aggregation module 326. These and other software components may be loaded from a non-transitory computer readable storage medium 318 into memory 304 of the server 300 using a drive mechanism (not shown) associated with a non-transitory computer readable storage medium 318, such as a floppy disc, tape, DVD/CD-ROM drive, flash card, memory card, or the like. In some embodiments, software components may also be loaded via the network interface 306, rather than via a computer readable storage medium 318. Special-purpose circuitry 322 may, in some variants, include some or all of the event-sequencing logic described below.

Figure 4:
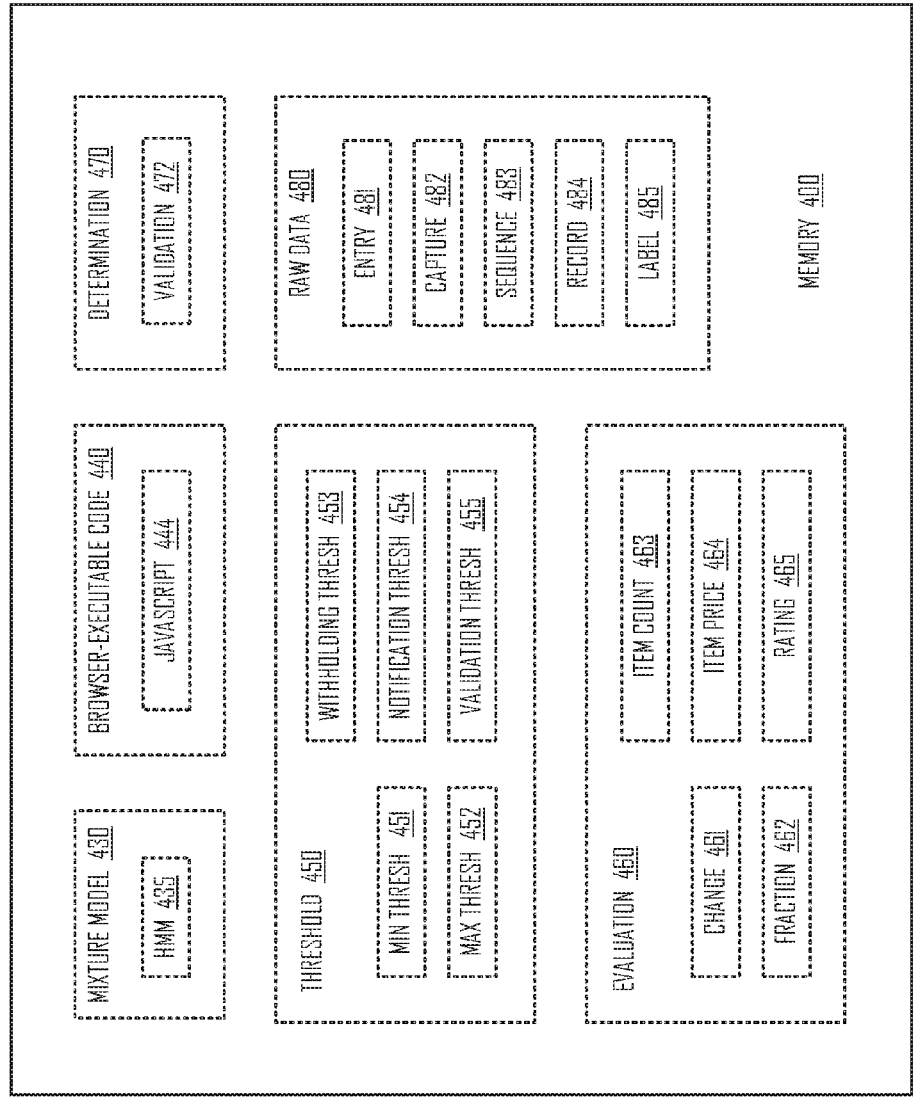
FIG. 4 depicts memory-resident data objects according to one or more embodiments.

FIG. 4 depicts memory 400 (nonvolatile storage, e.g.) configured to handle various software objects. These may include one or more instances of mixture models 430 (such as a Hidden Markov Model 435, e.g.); of browser-executable code 440 (such as modules of JavaScript 444 or other object-oriented scripting language, e.g.); of thresholds 450; of evaluations 460; of Boolean-valued validations 472 or other determinations 470; or of raw data 480 as further described below. In some variants, such thresholds may include various instances of withholding thresholds 453, of notification thresholds 454, of validation thresholds 455, or of other minimum thresholds 451 or maximum thresholds 452 (or combinations thereof). Likewise in some variants such evaluations may include various instances of item counts 463, of item prices 464, of individual or aggregate ratings 465, or of specific changes 461 or fractions 462 of quantifications described herein (or combinations thereof). Likewise in some variants such raw data 480 may include various instances of entries 481 (indicating user preferences or selections, e.g.); of image captures 482 (screenshots or pixel images, e.g.); of sequences 483; of transaction records 484; or of labels 485 as described herein (or combinations thereof).

Figure 5:
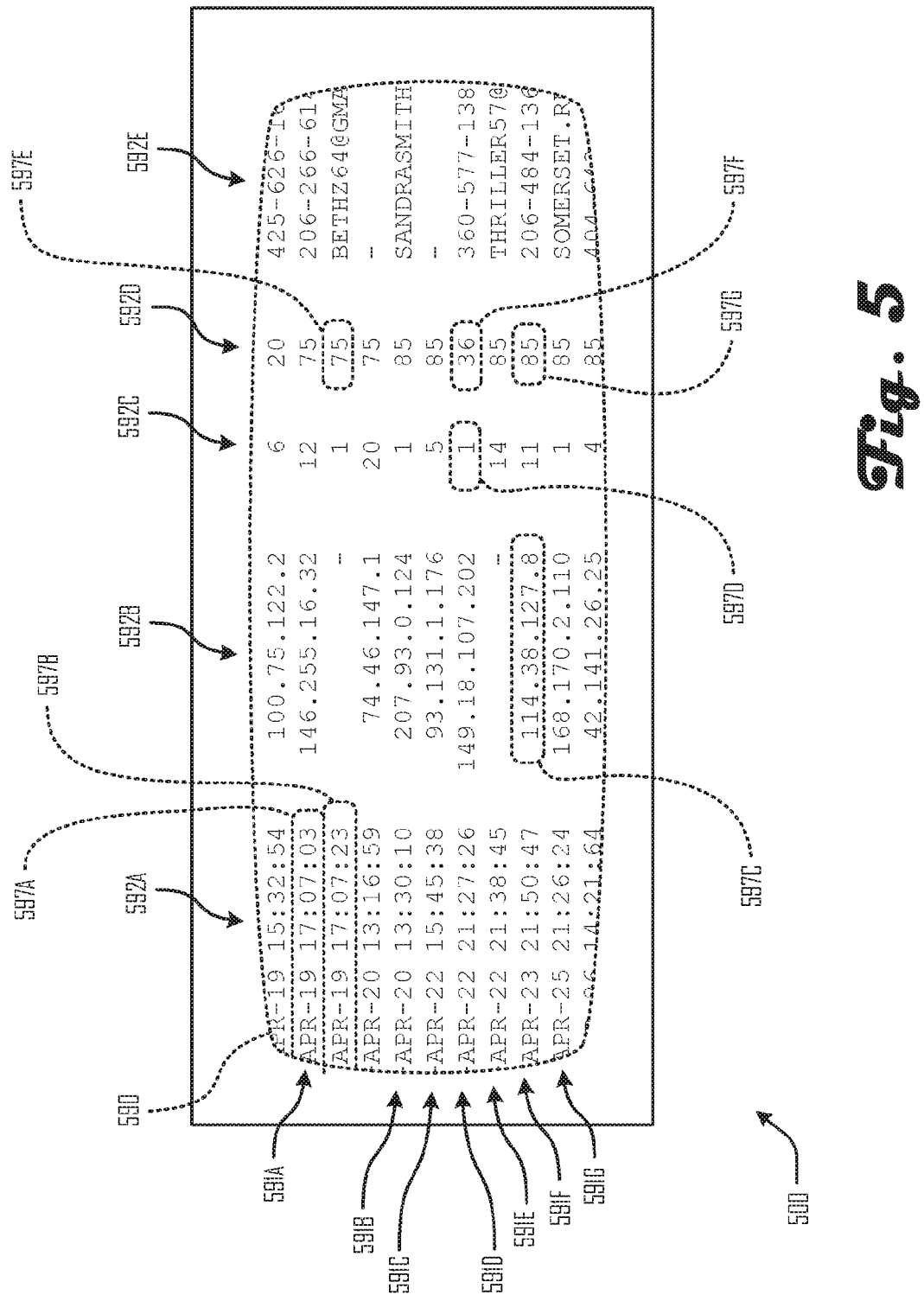
FIG. 5 depicts a sequence of event records according to one or more embodiments.

FIG. 5 depicts one or more data-handling media 500 configured to handle human behavior data 590 (a time-stamped sequence of records 591A-G, e.g.) that includes (an instance of) labeled numerical data indirectly indicative of an actual mutation (between scalar values of 75 and 85, e.g.). Successive values 597A, 597B in column 592A depict timestamps 20 seconds apart. One or more other values 597C in column 592B depict respective Internet Protocol (IP) addresses or other unique identifiers of respective client devices 200. One or more other values 597D in column 592C depict record types. This can occur, for example, in a context in which a value 597D of "1" signifies a transaction record (one that reflects a change in an item count or other inventory or a user having otherwise confirmed a value in column 592D, e.g.) and in which other values signify other respective modalities of data aggregation that have been used to obtain scalar values as shown (a particular JavaScript code block having been used to implement mode "11" to obtain value 597G, e.g.). One or more other values 597E-G in column 592D depict respective scalar values. This can occur, for example, in a context in which value 597E signifies a "before mutation" value, in which value 597F signifies noise, in which value 597G signifies an "after mutation" value that may or may not have yet been recognized as such, and in which column 592E provides a destination identifier (a text message or email address, e.g.).

Figure 6:
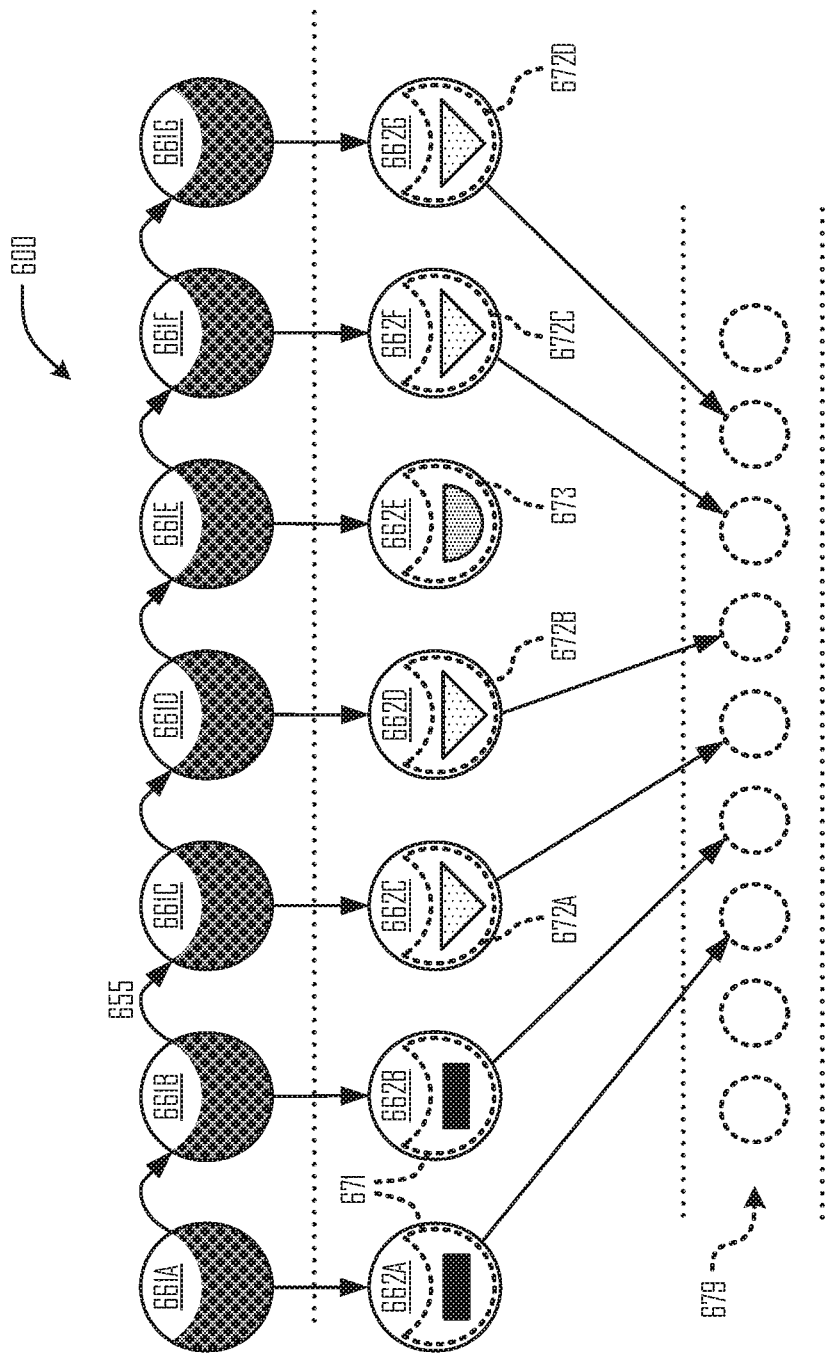
FIG. 6 depicts a mixture model having actual states and observable states according to one or more embodiments.

FIG. 6 depicts a graphical representation 600 of a mixture model 430 (HMM 435, e.g.) positing that a succession of (hidden) actual states 661A-G including a (single) true mutation 655 is approximated as a succession of observable states 662A-G. In a context in which such a succession could be observed in real time, a hypothetical human user might glean that the transition from state 662B to state 662C signified a true mutation from value 671 (manifested in two instances as shown, e.g.) to value 672 (manifested in four instances as shown values 672A-D, e.g.) notwithstanding some noise (at value 673, e.g.). With one or more such especially-unlikely having been removed, a sequence 679 may thereby be generated in which the signal-to-noise ratio is further improved.

Figure 7:
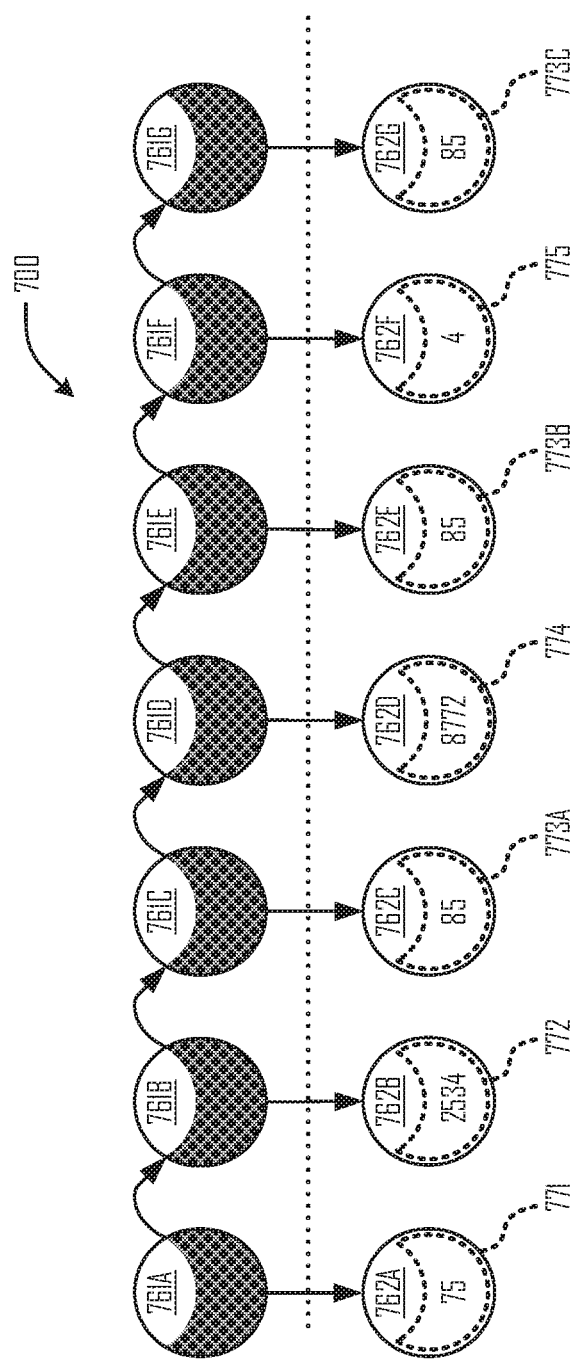
FIG. 7 depicts another mixture model having actual states and observable states according to one or more embodiments.

FIG. 7 depicts another graphical representation 700 of a mixture model 430 in which a succession of (hidden) actual states 761A-G that may or may not include one or more true mutations is approximated as a succession of observable states 762A-G manifested with scalar values 771, 772, 773A-C, 774, 775 as shown. In a context like this, where confirmatory instances of a newly-common value 773A-C (indicative of the signal apparently containing a mutation, e.g.) are occurring not much more frequently than tracked values 772, 774, 775 appearing to signify noise, generally a cautious approach (being slow to infer a true mutation) will be warranted. Less caution is needed in instances like the example of FIG. 7, however, because the less-common tracked values 772, 774, 775 (appearing to signify noise) do not support one another and because much of the noise is not within one order of magnitude of the "before mutation" scalar value. These and other attributes of scalar values make state variables based on them more amenable to quick filtration in many implementations described herein.

FIG. 8 depicts a particular scenario and progressive data flow 800 in which one or more client devices 200 and servers 300 (operably coupled via linkages 144 or via the Internet as shown in FIG. 1, e.g.) interact. Directory content 805 (comprising a listing, catalog, database, or other organized body of information having mutable scalar quantities associated with a label as described herein, e.g.) and behavior monitoring code 810 (comprising JavaScript 444 or other object-oriented browser-executable code 440, e.g.) are loaded onto a server 300A so that, as many of the client devices 200C-Z each visit a website 320 resident at server 300A (each using a respective instance of linkage 144D, e.g.), the behavior monitoring code 810 is downloaded to such devices in many instances and executed (within respective instances of web browsers 214 thereof, e.g.). In many configurations this triggers a data flow 145 to one or more servers 300B as a real-time or other contemporaneous reporting of site visit data 815, 825 including directory request data (what a user requested or received in response to a request, e.g.) such as labeled numerical data 820, 830 that confirm a "before mutation" value state (of 75 in FIG. 7, e.g.) that is observable only indirectly (in state 662B or state 762A, e.g.).

Some time later, one or more mutations 655 occur that are not directly observable at one or more aggregation servers 300B. Such modifications may take the form of a content modification 840 made to one or more critical components (scalar values, e.g.) of directory content 805 deliberately by a user of device 200A who does not promptly and directly report the event to server 300B. Alternatively or additionally, some such modifications may result from an automatic process (aggregating visitor-provided scalar evaluations, event counts, or reductions of an inventory, e.g.), sometimes without anyone having immediate direct knowledge. In some contexts such mutations can be gleaned, however, from observations "after mutation" (reflected in site visit data 845A-C and labeled numerical data 850A-C, e.g.). Depending upon noisy observations and one or more filtering policies as described herein, many instances of modification non-detection 870 may occur until a newest observation (labeled numerical data 850C, e.g.) warrants a modification detection 890 and appropriate notification 895 as described below.

FIG. 9 illustrates special-purpose transistor-based circuitry 900—optionally implemented as an Application-Specific Integrated Circuit (ASIC), e.g.—in which some or all of the functional modules described below may be implemented. Transistor-based circuitry 900 is an event-sequencing structure generally as described in U.S. Pat. Pub. No. 2015/0094046 but configured as described herein. Transistor-based circuitry 900 may include one or more instances of modules 921-923 configured for local processing, for example, each including an electrical node set 931-933 upon which informational data is represented digitally as a corresponding voltage configuration 941-943. In some variants, moreover, an instance of modules 921-923 may be configured for invoking such processing modules remotely in a distributed implementation. Transistor-based circuitry 900 may likewise include one or more instances of modules 924-925 configured for programmatic response as described below, for example, each including an electrical node set 934-935 upon which informational data is represented digitally as a corresponding voltage configuration 944-945. In some variants, an instance of modules 923 may be configured for invoking such programmatic response modules remotely in a distributed implementation.

In the interest of concision and according to standard usage in information management technologies, the functional attributes of modules described herein are set forth in natural language expressions. It will be understood by those skilled in the art that such expressions (functions or acts recited in English, e.g.) adequately describe structures identified below so that no undue experimentation will be required for their implementation. For example, any records 591 or other informational data identified herein may easily be represented digitally as a voltage configuration on one or more electrical nodes (conductive pads of an integrated circuit, e.g.) of an event-sequencing structure without any undue experimentation. Each electrical node is highly conductive, having a corresponding nominal voltage level that is spatially uniform generally throughout the node (within a device or local system as described herein, e.g.) at relevant times (at clock transitions, e.g.). Such nodes (lines on an integrated circuit or circuit board, e.g.) may each comprise a forked or other signal path adjacent one or more transistors. Moreover many Boolean values (yes-or-no decisions, e.g.) may each be manifested as either a "low" or "high" voltage, for example, according to a complementary metal-oxide-semiconductor (CMOS), emitter-coupled logic (ECL), or other common semiconductor configuration protocol. In some contexts, for example, one skilled in the art will recognize an "electrical node set" as used herein in reference to one or more electrically conductive nodes upon which a voltage configuration (of one voltage at each node, for example, with each voltage characterized as either high or low) manifests a yes/no decision or other digital data.

FIG. 10 illustrates an operational flow 1000 in which one or more technologies may be implemented (within or in conjunction with one or more servers 300B, e.g.). At operation 1025, directory data is received that includes a first alphanumeric label that describes a first scalar number (one or more invocation or processing modules 921 of special-purpose circuitry 322 receiving raw data 480 at least some of which reflects a first sequence of actual states 661, 761 that include a scalar "before mutation" number 671 identified by a corresponding alphanumeric label 485, e.g.). This can occur, for example, in a context in which server 300B aggregates a record 591 of each event reported by a respective client device; in which indices of reliability as described herein are present for each such event; in which such reports result from behavior-monitoring code 810 downloaded by each such device from a hosting server 300A; in which the label 485 includes a noun ("donation" or a name of a product or entity 110, e.g.); in which the raw data 480 signals that a particular visitor (using device 200D, e.g.) received the first scalar number and first alphanumeric label as labeled numerical data 820; and in which the first scalar number is manifested as a voltage configuration 941 on node set 931. Alternatively or additionally, a priori values can in some contexts have been provided as the "before mutation" numerical data used by server 300B.

At operation 1045, human behavior data is received from many browser client devices that have each received both behavior monitoring code and directory request data (one or more invocation or processing modules 922 receiving a body of reporting data 590 that relates to the first alphanumeric label 485 as a result of such devices having received the behavior monitoring code 810 and directory request data, e.g.). This can occur, for example, in a context the directory request data comprises one or more user data entries 481 (via a mouse or touchscreen, e.g.) by which each visitor guides each visit, in which the behavior monitoring code 810 is downloaded to each such device via a respective instance of linkage 144D (as a component of site visit data 845, e.g.); in which server 300B aggregates one record 591 of each behavioral event thus reported; in which a storage location of at least some of the available values 672, 772 is manifested as a voltage configuration 942 (a pathname or other address, e.g.) on node set 932; in which most of such devices are in use by mutually autonomous visitors (i.e. acting upon an individual prerogative); in which content modifications 840 affecting the directory content would otherwise remain unknown to server 300B until and unless a user of client device 200A got around to informing server 300B (via linkage 144C, e.g.); in which appropriate action as an automatic response to such content modifications 840 (timely selective notification 895 concerning a breach or other significant event, e.g.) is critical; and in which the human behavior data includes a text address, email address, or other notification destination identifier (as depicted in some records 591 at column 592E, e.g.).

At operation 1065, a second scalar number also described by the alphanumeric label is automatically and conditionally accepted as a true mutation conditionally in response to correlating a candidate number with at least the human behavior data from a subset plurality of the many browser client devices (one or more invocation or processing modules 923 automatically accepting a value 672, 773 as a true mutation of a prior value 671, 771 as a conditional response to at least some older values 672, 773 from first and second devices 200C, 200Z with a newest value 672D, 773C). This can occur, for example, in a context in which both the newest and the older values (in sequence 679, e.g.) are described by a shared label 485; in which a Hidden Markov Model 435 or other mixture model 430 is used to generate an approximate likelihood manifested as a voltage configuration 943 on node set 933 that the newest value signals a true mutation 655; and in which module 923 accepts the newest value as the second scalar number if the approximate likelihood exceeds a user-provided threshold 450. In the context of reporting data 590, for example, a fourth value 597G of "85" confirms the prior instances of "85" enough to warrant an acceptance that the prior value of "75" formerly described by label 485 has now truly been changed to the new value of "85." In light of teachings herein, various adaptations of module 923 may be implemented without any undue experimentation. In a more aggressive one, a true mutation is gleaned upon a third occurrence of the new value conditionally, provided that an adequate fraction 462 (a majority, e.g.) of the newest observed states (reported in record 591B-E, e.g.) concur. In a more aggressive one, a true mutation may be gleaned (about a day earlier, in this instance) upon a third occurrence of the new value, as a conditional response to module 923 determining that at least a first fraction 462 (at least 60%, e.g.) of the newest observed states (reported in record 591B-E, e.g.) concur. In a less aggressive one, a true mutation may be gleaned (about two days later, in this instance) upon a fifth occurrence of the new value, as a conditional response to module 923 determining that at least a second fraction (at least 85%, e.g.) of the newest observed states (reported in record 591B-G, e.g.) support one another.

In some variants one or more instances of module 923 may enhance performance by invoking one or more response modules 924-925. This can occur, for example, in a context in which module 924 aggregates from a multitude of mutually autonomous visitor devices 200 (more than 100, e.g.) scalar data (as event records 591, e.g.) that includes a sequence of many scalar numbers each described by the first alphanumeric label; in which such description is inferred from the label and scalar data having been observed together in a common image capture 482 or transaction record 484; and in which a likeliest one of the available mutations (the one having the highest number of supporting values, e.g.) is manifested as a voltage configuration 944 on node set 934. Alternatively or additionally, module 925 may effectively filter one or more "stale" and otherwise unworthy scalar numbers from a sequence 483 by determining and removing an oldest uncommon value in a saturated sequence (removing an oddball value 673, 772 from a sequence having a predetermined maximum length, e.g.) to obtain a filtered sequence 679.

FIG. 11 depicts a graphical arrangement plotting magnitude 1101 (of a scalar component of a sequence of values, e.g.) generally as a function of successive events that occur at respective times 1102. A long sequence of states is shown that have a scalar value of 10, a last one of which is value 1161A. A true mutation 1155 then occurs so that a next successive event signifies a value 1161B of 20, after which a long sequence of states is shown with no further mutation. In response, one or more aggregation servers 300B that receive human behavior data (manifested as records 591 having scalar values 1161 as shown, e.g.) from respective visitor devices detects, with appropriate caution in response to a plausible quantitative shift (i.e. less than an order of magnitude) and to an apparent absence of any noise, confirm the mutation in a model output signal 1163 after only a few unanimously supporting values (i.e. fewer than six) are observed. In response to such detection, a module 923 thereof transmits the newest value in one or more modes as described below (in the clauses, e.g.).

FIG. 12 depicts a graphical arrangement plotting magnitude 1201 (of a scalar component of a sequence of values, e.g.) generally as a function of successive events that occur at respective times 1202. A noisy sequence of states is shown that have various scalar values many of which confirm a "first" scalar value 1271. At some unknown time that apparently might have been awhile before time 1265, a mutation indicative "second" scalar value 1272 began to appear and to be more prevalent than "first" scalar value 1271. After at least seven confirmatory values tending to support the new hypothesis (of a mutation to scalar value 1272) and a smaller number of values are seen tending to support any other value (even the "first" scalar value 1271), module 923 at last grudgingly takes action in regard to the new hypothesis, manifesting a transition smaller than an order of magnitude in model output signal 1263 at time 1265. In response, module 923 transmits a selective notification 895 containing the newest value 1272 in any of the one or more modes described below (in the clauses, e.g.).

Figure 13:
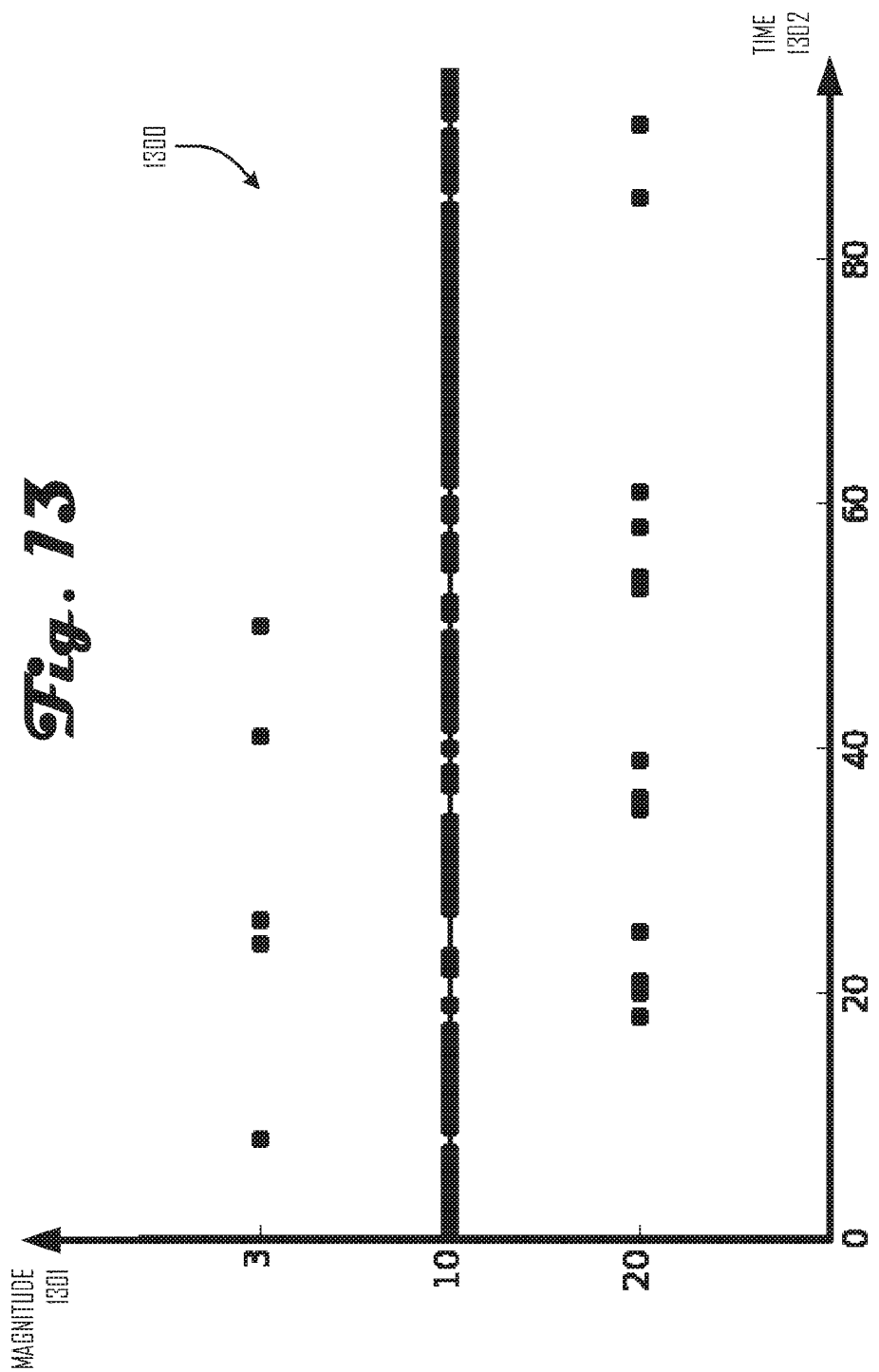
FIG. 13 depicts a noisy environment as a circumstance in which no mutation is inferred according to one or more embodiments.

FIG. 13 depicts a graphical arrangement plotting magnitude 1301 (of a scalar component of a sequence of values, e.g.) generally as a function of successive events that occur at respective times 1302. A noisy sequence of states is shown that have various scalar values many of which confirm a "first" scalar value of 10. Although competing isotopes having other scalar values (of 3 and 20) appear, module 923 infers that they are erroneous as a conditional response to having determined that none of them appear more prevalently than the "first" scalar value. In such circumstances module 923 takes no action.

In light of teachings herein, numerous existing techniques may be applied for configuring special-purpose circuitry or other structures effective for configuring a server to respond to an automatically detected event combination (by making a data association, e.g.) or other tasks as described herein without undue experimentation. See, e.g., U.S. Pat. No. 9,576,313 ("Recommendation systems and methods using interest correlation"); U.S. Pat. No. 9,569,439 ("Context-sensitive query enrichment"); U.S. Pat. No. 9,177,059 ("Method and system for determining allied products"); U.S. Pat. No. 7,047,169 ("Method for optimizing a solution set"); U.S. Pat. Pub. No. 20150379115 ("Product classification data transfer and management"); U.S. Pat. Pub. No. 20150350849 ("Location determination using dual statistical filters"); U.S. Pat. Pub. No. 20140214845 ("Product classification into product type families"); U.S. Pat. Pub. No. 20140214844 ("Multiple classification models in a pipeline"); U.S. Pat. Pub. No. 20140172767 ("Budget optimal crowdsourcing"); and U.S. Pat. Pub. No. 20110313933 ("Decision-theoretic control of crowd-sourced workflows").

With respect to the numbered clauses and claims expressed below, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise. Also in the numbered clauses below, specific combinations of aspects and embodiments are articulated in a shorthand form such that (1) according to respective embodiments, for each instance in which a "component" or other such identifiers appear to be introduced (with "a" or "an," e.g.) more than once in a given chain of clauses, such designations may either identify the same entity or distinct entities; and (2) what might be called "dependent" clauses below may or may not incorporate, in respective embodiments, the features of "independent" clauses to which they refer or other features described above.

CLAUSES 1. (Independent) A computer-implemented online directory management system comprising:
   transistor-based circuitry (module 921, e.g.) configured to receive at one or more servers 300B directory data (comprising raw data 480, e.g.) including a first value (value 671 or value 771, e.g.) and a first alphanumeric label 485 that describes the first value;
   transistor-based circuitry (module 922, e.g.) configured to receive at the one or more servers human behavior data (manifested as records 591, e.g.) from first, second, and third browser client devices 200 that have each received both behavior monitoring code 810 and directory request data (user data entries 481, e.g.); and
   transistor-based circuitry (module 923, e.g.) configured to transmit a second value (value 672 or value 773, e.g.) also described by the first alphanumeric label 485 as a true mutation 655 of the first value as an automatic and conditional response to correlating a newest value with at least the human behavior data from the first and second browser client devices after the first, second, and third browser client devices have received the first alphanumeric label, wherein the newest value is the second value.

2. The system of SYSTEM CLAUSE 1, wherein the transistor-based circuitry all resides in a single common Application Specific Integrated Circuit (ASIC).

3. The system of any of the above SYSTEM CLAUSES, wherein the system is configured to perform one of the METHOD CLAUSES set forth herein.

4. (Independent) A computer-implemented online directory management method comprising:
   invoking transistor-based circuitry (module 921, e.g.) configured to receive at one or more servers 300B directory data (comprising raw data 480, e.g.) including a first value (value 671 or value 771, e.g.) and a first alphanumeric label 485 that describes the first value;
   invoking transistor-based circuitry (module 922, e.g.) configured to receive at the one or more servers human behavior data (manifested as records 591, e.g.) from first, second, and third browser client devices 200 that have each received both behavior monitoring code 810 and directory request data (user data entries 481, e.g.); and
   automatically transmitting (by invoking module 923, e.g.) a second value (value 672 or value 773, e.g.) also described by the first alphanumeric label 485 as a true mutation 655 of the first value as a conditional response to correlating a newest value with at least the human behavior data from the first and second browser client devices after the first, second, and third browser client devices have received the first alphanumeric label, wherein the newest value is the second value.

5. The method of any of the above METHOD CLAUSES, wherein the first and second values are within an order of magnitude (i.e. differing by at most a factor of ten).

6. The method of any of the above METHOD CLAUSES, wherein the first value is a first scalar number and wherein the second value is a second scalar number.

7. The method of any of the above METHOD CLAUSES, wherein the second value is smaller than the first value.

8. The method of any of the above METHOD CLAUSES, wherein the first and second values comprise item counts 463.

9. The method of any of the above METHOD CLAUSES, wherein the first and second values comprise item prices 464.

10. The method of any of the above METHOD CLAUSES, wherein the first and second values comprise quality ratings 465.

11. The method of any of the above METHOD CLAUSES, wherein the directory request data identifies a catalog website.

12. The method of any of the above METHOD CLAUSES, wherein the first alphanumeric label identifies a product or service.

13. The method of any of the above METHOD CLAUSES, wherein the first alphanumeric label identifies a physical article.

14. The method of any of the above METHOD CLAUSES, wherein the first alphanumeric label includes a natural language expression.

15. The method of any of the above METHOD CLAUSES, wherein the first alphanumeric label includes a noun.

16. The method of any of the above METHOD CLAUSES, wherein the automatically transmitting the second value also described by the first alphanumeric label as the true mutation of the first value as the conditional response to correlating the newest value with at least the human behavior data from the first and second browser client devices after the first, second, and third browser client devices have received the first alphanumeric label comprises:
- aggregating from a multitude of mutually autonomous visitor devices scalar data that includes a sequence of many scalar numbers each described by the first alphanumeric label and each having a respective timestamp (having a value 597 as shown in column 592A, e.g.), wherein the sequence of many scalar numbers includes the newest scalar number and wherein the first value is the first scalar number and wherein the second value is the second scalar number;
- eliminating one or more scalar numbers that are not equal to the newest scalar number from the sequence of many scalar numbers (by omitting state 662E or state 762D, e.g.); and
- accepting the newest scalar number of a remainder of the sequence as a conditional response to a determination that the newest scalar number signals a mutation having a likelihood greater than a likelihood threshold, wherein the newest scalar number is the second scalar number, and wherein the first, second, and third browser client devices are among the multitude of mutually autonomous visitor devices.

17. The method of any of the above METHOD CLAUSES, wherein the automatically transmitting the second value also described by the first alphanumeric label as the true mutation of the first value as the conditional response to correlating the newest value with at least the human behavior data from the first and second browser client devices after the first, second, and third browser client devices have received the first alphanumeric label comprises:
- aggregating from a multitude of mutually autonomous visitor devices scalar data that includes a sequence of many scalar numbers each described by the first alphanumeric label and each having a respective timestamp (having a value 597 as shown in column 592A, e.g.), wherein the sequence of many scalar numbers includes the newest scalar number and wherein the first value is the first scalar number and wherein the second value is the second scalar number;
- eliminating an oldest one or more scalar numbers that are not equal to the newest scalar number from the sequence of many scalar numbers; and
- accepting the newest scalar number of a remainder of the sequence as a conditional response to a determination that the newest scalar number signals a mutation having a likelihood greater than a likelihood threshold, wherein the newest scalar number is the second scalar number, and wherein the first, second, and third browser client devices are among the multitude of mutually autonomous visitor devices.

18. The method of any of the above METHOD CLAUSES, wherein the automatically transmitting the second value also described by the first alphanumeric label as the true mutation of the first value as the conditional response to correlating the newest value with at least the human behavior data from the first and second browser client devices after the first, second, and third browser client devices have received the first alphanumeric label comprises:
- causing a fourth browser client device 200D remote from the one or more servers to display the second value and the first alphanumeric label simultaneously (as an alert via an instance of display hardware 212 and local app 224, e.g.) as a conditional response to having received the first value from the fourth browser client device.

19. The method of any of the above METHOD CLAUSES, wherein the automatically transmitting the second value also described by the first alphanumeric label as the true mutation of the first value as the conditional response to correlating the newest value with at least the human behavior data from the first and second browser client devices after the first, second, and third browser client devices have received the first alphanumeric label comprises:
- receiving a component of the human behavior data from the second browser client device only as a result of the behavior monitoring code 810 being executed in a browser of the second browser client device, wherein the behavior monitoring code is not maintained in any non-transitory storage medium of the second browser client device; and
- using the component of the human behavior data from the second browser client device at the one or more servers only after the behavior monitoring code is deleted from the second browser client device.

20. The method of any of the above METHOD CLAUSES, wherein the automatically transmitting the second value also described by the first alphanumeric label as the true mutation of the first value as the conditional response to correlating the newest value with at least the human behavior data from the first and second browser client devices after the first, second, and third browser client devices have received the first alphanumeric label comprises:
- identifying more than 20 recipients that are each associated with a client device that has received the first value within a recent interval that is more than one day and less than one year; and
- transmitting a message containing the first alphanumeric label to the more than 20 recipients within 5 minutes of and as an automatic and conditional response to a validation 472 of the second value (indicating an inventory or price having fallen below a threshold, e.g.).

21. The method of any of the above METHOD CLAUSES, wherein the automatically transmitting the second value also described by the first alphanumeric label as the true mutation of the first value as the conditional response to correlating the newest value with at least the human behavior data from the first and second browser client devices after the first, second, and third browser client devices have received the first alphanumeric label comprises:
- identifying more than 20 recipients that are each associated with a client device that has received the first value within a recent interval that is more than one day and less than one year; and
- transmitting a message containing both the first alphanumeric label and the second value to the more than 20 recipients within 5 minutes of and as an automatic and conditional response to a validation 472 of the second value (indicating an inventory or price having fallen below a threshold, e.g.).

22. The method of any of the above METHOD CLAUSES, wherein the automatically transmitting the second value also described by the first alphanumeric label as the true mutation of the first value as the conditional response to correlating the newest value with at least the human behavior data from the first and second browser client devices after the first, second, and third browser client devices have received the first alphanumeric label comprises:
automatically accepting the second value as a conditional response to a determination 470 (directly or otherwise signifying) that a fraction F of a last N samples that support the second value exceeds a threshold T, wherein 2<N<10 and 0.55<T<0.95 (wherein the server could not otherwise respond appropriately to a small-but-sufficient "after mutation" data sequence, e.g.).

23. The method of any of the above METHOD CLAUSES, wherein the automatically transmitting the second value also described by the first alphanumeric label as the true mutation of the first value as the conditional response to correlating the newest value with at least the human behavior data from the first and second browser client devices after the first, second, and third browser client devices have received the first alphanumeric label comprises:
automatically accepting the second value as a conditional response to a determination (signifying) that a fraction F of a last N samples that support the second value exceeds a threshold T, wherein 7<N<70 and 0.4<T<0.8 (wherein the server could not otherwise respond appropriately to a noisy-but-sufficient "after mutation" data sequence, e.g.).

24. The method of any of the above METHOD CLAUSES, wherein the automatically transmitting the second value also described by the first alphanumeric label as the true mutation of the first value as the conditional response to correlating the newest value with at least the human behavior data from the first and second browser client devices after the first, second, and third browser client devices have received the first alphanumeric label comprises:
automatically withholding a validation 472 of the second value pending a confirmation from a particular entity 110A (requested via linkage 144C to client device 200A, e.g.) as a conditional response to a determination (signifying) that a fractional change 461 of the first value (i.e. to the second value) has a magnitude greater than a withholding threshold 453 that is at least 40% of the first value (wherein the server could not otherwise respond appropriately to a suspiciously large mutation, e.g.).

25. The method of any of the above METHOD CLAUSES, wherein the automatically transmitting the second value also described by the first alphanumeric label as the true mutation of the first value as the conditional response to correlating the newest value with at least the human behavior data from the first and second browser client devices after the first, second, and third browser client devices have received the first alphanumeric label comprises:
automatically requesting a validation 472 of the second value from a particular entity (as a selective notification 895 transmitted via linkage 144C to client device 200A, e.g.) as a conditional response to a determination that a fractional change 461 of a scalar component of the first value (transitioning from 75 to 85, e.g.) has a magnitude greater than a minimum threshold 451 that is between 5% of and 50% of the first value (wherein the server could not otherwise respond appropriately to a clearly reliable mutation, e.g.).

26. The method of any of the above METHOD CLAUSES, wherein the automatically transmitting the second value also described by the first alphanumeric label as the true mutation of the first value as the conditional response to correlating the newest value with at least the human behavior data from the first and second browser client devices after the first, second, and third browser client devices have received the first alphanumeric label comprises:
automatically transmitting a warning about the second value (via linkage 144C to client device 200A, e.g.) as a conditional response to a determination (signifying) that a fractional change 461 of a scalar component of the first value has a magnitude greater than a notification threshold 454, wherein the notification threshold is more than 20% of the scalar component of the first value.

27. The method of any of the above METHOD CLAUSES, wherein the automatically transmitting the second value also described by the first alphanumeric label as the true mutation of the first value as the conditional response to correlating the newest value with at least the human behavior data from the first and second browser client devices after the first, second, and third browser client devices have received the first alphanumeric label comprises:
automatically transmitting a warning about the second value (via linkage 144C to client device 200A, e.g.) as a conditional response to a determination (signifying) that a fractional change 461 of a scalar component of the first value has a magnitude greater than a notification threshold 454, wherein the notification threshold is less than 50% of the scalar component of the first value.

28. The method of any of the above METHOD CLAUSES, wherein the automatically transmitting the second value also described by the first alphanumeric label as the true mutation of the first value as the conditional response to correlating the newest value with at least the human behavior data from the first and second browser client devices after the first, second, and third browser client devices have received the first alphanumeric label comprises:
capturing at least a component of the first alphanumeric label by matching a text string found in the graphical image with a particular product name listed in the directory data.

29. The method of any of the above METHOD CLAUSES, wherein the automatically transmitting the second value also described by the first alphanumeric label as the true mutation of the first value as the conditional response to correlating the newest value with at least the human behavior data from the first and second browser client devices after the first, second, and third browser client devices have received the first alphanumeric label comprises:
capturing a first name as (at least a component of) the first alphanumeric label and a graphical image of an item corresponding to the first name; and
deriving the second value by verifying that a series of two or more characters extracted from within the graphical image signifies an extracted value that differs from the first value.

30. The method of any of the above METHOD CLAUSES, wherein the automatically transmitting the second value also described by the first alphanumeric label as the true mutation of the first value as the conditional response to correlating the newest value with at least the human behavior data from the first and second client devices after the first, second, and third browser client devices have received the first alphanumeric label comprises:
  correlating the second value with at least the human behavior data from the first and second devices by applying a mixture model 430 to a portion of the human behavior data from the first, second, and third browser client devices.

31. The method of any of the above METHOD CLAUSES, wherein the automatically transmitting the second value also described by the first alphanumeric label as the true mutation of the first value as the conditional response to correlating the newest value with at least the human behavior data from the first and second browser client devices after the first, second, and third browser client devices have received the first alphanumeric label comprises:
  applying a Hidden Markov Model 435 to a portion of the human behavior data from the first, second, and third browser client devices as a component of correlating the second value with at least the human behavior data from the first and second devices.

While various system, method, article of manufacture, or other embodiments or aspects have been disclosed above, also, other combinations of embodiments or aspects will be apparent to those skilled in the art in view of the above disclosure. The various embodiments and aspects disclosed above are for purposes of illustration and are not intended to be limiting, with the true scope and spirit being indicated in the final claim set that follows.

What is claimed is:

1. A computer-implemented online directory management method comprising:
  invoking transistor-based circuitry configured to receive at one or more servers directory data including a first scalar number and a first alphanumeric label that describes said first scalar number;
  invoking transistor-based circuitry configured to receive at said one or more servers human behavior data from first, second, and third browser client devices that have each received both behavior monitoring code and directory request data; and
  automatically transmitting a second scalar number also described by said first alphanumeric label as a true mutation of said first scalar number as a conditional response to correlating a newest scalar number with at least said human behavior data from said first and second browser client devices after said first, second, and third browser client devices have received said first alphanumeric label by
  (1) aggregating from a multitude of mutually autonomous visitor devices scalar data that includes a sequence of many scalar numbers each described by said first alphanumeric label, said sequence of many scalar numbers including said newest scalar number;
  (2) eliminating an oldest one or more scalar numbers that are not equal to said newest scalar number from said sequence of many scalar numbers; and
  (3) accepting said newest scalar number of said remainder of said sequence as a conditional response to a determination that said newest scalar number signals a mutation having a likelihood greater than a likelihood threshold, wherein said newest scalar number is said second scalar number by determining that a likelihood that said newest scalar number has supplanted said first scalar number based upon a mixture model and determining that said estimated likelihood exceeds a likelihood threshold, wherein said newest scalar number is said second scalar number, wherein said first and second scalar numbers are within an order of magnitude, and wherein said multitude of mutually autonomous visitor devices include said first, second, and third browser client devices.

2. The computer-implemented online directory management method of claim 1, wherein said first scalar number is a first price and wherein said second scalar number is a second price.

3. The computer-implemented online directory management method of claim 1, wherein said mixture model is a Hidden Markov Model.

4. The computer-implemented online directory management method of claim 1, wherein said automatically transmitting said second value also described by said first alphanumeric label as said true mutation of said first value as said conditional response to correlating said newest value with at least said human behavior data from said first and second browser client devices after said first, second, and third browser client devices have received said first alphanumeric label comprises:
  automatically requesting a validation of said second value from a particular entity as a conditional response to a determination that a fractional change of a scalar component of said first value has a magnitude greater than a minimum threshold that is between 5% of and 50% of said first value.

5. The computer-implemented online directory management method of claim 1, wherein said automatically transmitting said second value also described by said first alphanumeric label as said true mutation of said first value as said conditional response to correlating said newest value with at least said human behavior data from said first and second browser client devices after said first, second, and third browser client devices have received said first alphanumeric label comprises:
  automatically transmitting a warning about said second value as a conditional response to a determination that a fractional change of a scalar component of said first value has a magnitude greater than a notification threshold, wherein said notification threshold is more than 20% of a scalar component of said first value.

6. The computer-implemented online directory management method of claim 1, wherein said automatically transmitting said second value also described by said first alphanumeric label as said true mutation of said first value as said conditional response to correlating said newest value with at least said human behavior data from said first and second browser client devices after said first, second, and third browser client devices have received said first alphanumeric label comprises:
  causing a fourth browser client device to display said second value and said first alphanumeric label simultaneously as a conditional response to having received said first value from said fourth browser client device, wherein said multitude of mutually autonomous visitor devices includes said fourth browser client device.

7. A computer-implemented online directory management method comprising:

invoking transistor-based circuitry configured to receive at one or more servers directory data including a first value and a first alphanumeric label that describes said first value;

invoking transistor-based circuitry configured to receive at said one or more servers human behavior data from first, second, and third browser client devices that have each received both behavior monitoring code and directory request data; and automatically transmitting a second value also described by said first alphanumeric label as a true mutation of said first value as a conditional response to correlating a newest value with at least said human behavior data from said first and second browser client devices after said first, second, and third browser client devices have received said first alphanumeric label, wherein said newest value is said second value, and wherein said first and second values are within an order of magnitude; and wherein (1) aggregating from a multitude of mutually autonomous visitor devices scalar data that includes a sequence of many scalar numbers each described by said first alphanumeric label and each having a respective timestamp, said sequence of many scalar numbers including said newest scalar number; and (2) eliminating one or more scalar numbers that are not equal to said newest scalar number from said sequence of many scalar numbers; and (3) accepting said newest scalar number of said remainder of said sequence as a conditional response to a determination that said newest scalar number signals a mutation having a likelihood greater than a likelihood threshold, wherein said newest scalar number is said second scalar number, wherein said newest scalar number is said second scalar number and wherein said first, second, and third browser client devices are among said multitude of mutually autonomous visitor devices.

8. The computer-implemented online directory management method of claim 7, wherein said automatically transmitting said second value also described by said first alphanumeric label as said true mutation of said first value as said conditional response to correlating said newest value with at least said human behavior data from said first and second browser client devices after said first, second, and third browser client devices have received said first alphanumeric label comprises:

causing a fourth browser client device to display said second value and said first alphanumeric label simultaneously as a conditional response to having received said first value from said fourth browser client device.

9. The computer-implemented online directory management method of claim 7, wherein said automatically transmitting said second value also described by said first alphanumeric label as said true mutation of said first value as said conditional response to correlating said newest value with at least said human behavior data from said first and second browser client devices after said first, second, and third browser client devices have received said first alphanumeric label comprises:

identifying more than 20 recipients that are each associated with a client device that has received said first value within a recent interval that is more than one day and less than one year; and transmitting a message containing said first alphanumeric label to said more than 20 recipients within 5 minutes of and as an automatic and conditional response to a validation of said second value.

10. The computer-implemented online directory management method of claim 7, wherein said automatically transmitting said second value also described by said first alphanumeric label as said true mutation of said first value as said conditional response to correlating said newest value with at least said human behavior data from said first and second browser client devices after said first, second, and third browser client devices have received said first alphanumeric label comprises:

automatically requesting a validation of said second value from a particular entity as a conditional response to a determination that a fractional change of a scalar component of said first value has a magnitude greater than a minimum threshold that is between 5% of and 50% of said first value.

11. The computer-implemented online directory management method of claim 7, wherein said automatically transmitting said second value also described by said first alphanumeric label as said true mutation of said first value as said conditional response to correlating said newest value with at least said human behavior data from said first and second browser client devices after said first, second, and third browser client devices have received said first alphanumeric label comprises:

automatically transmitting a warning about said second value as a conditional response to a determination that a fractional change of a scalar component of said first value has a magnitude greater than a notification threshold, wherein said notification threshold is more than 20% of said scalar component of said first value.

12. The computer-implemented online directory management method of claim 7, wherein said automatically transmitting said second value also described by said first alphanumeric label as said true mutation of said first value as said conditional response to correlating said newest value with at least said human behavior data from said first and second browser client devices after said first, second, and third browser client devices have received said first alphanumeric label comprises:

capturing at least a component of said first alphanumeric label by matching a text string found in said graphical image with a particular product name listed in said directory data.

13. The computer-implemented online directory management method of claim 7, wherein said automatically transmitting said second value also described by said first alphanumeric label as said true mutation of said first value as said conditional response to correlating said newest value with at least said human behavior data from said first and second browser client devices after said first, second, and third browser client devices have received said first alphanumeric label comprises:

capturing a first name as said first alphanumeric label and a graphical image of an item corresponding to said first name; and deriving said second value by verifying that a series of two or more characters extracted from within said graphical image signifies an extracted value that differs from said first value.

14. The computer-implemented online directory management method of claim 7, wherein said automatically transmitting said second value also described by said first alphanumeric label as said true mutation of said first value as said conditional response to correlating said newest value with at least said human behavior data from said first and second browser client devices after said first, second, and third browser client devices have received said first alphanumeric label comprises:

applying a Hidden Markov Model to a portion of said human behavior data from said first, second, and third browser client devices as a component of correlating said second value with at least said human behavior data from said first and second devices.

15. The computer-implemented online directory management method of claim 7, wherein said automatically transmitting said second value also described by said first alphanumeric label as said true mutation of said first value as said conditional response to correlating said newest value with at least said human behavior data from said first and second browser client devices after said first, second, and third browser client devices have received said first alphanumeric label comprises:

automatically accepting said second value as a conditional response to a determination that a fraction F of a last N samples that support said second value exceeds a threshold T, wherein 7<N<70 and 0.4<T<0.8.

16. The computer-implemented online directory management method of claim 7, wherein said automatically transmitting said second value also described by said first alphanumeric label as said true mutation of said first value as said conditional response to correlating said newest value with at least said human behavior data from said first and second browser client devices after said first, second, and third browser client devices have received said first alphanumeric label comprises:

automatically transmitting a warning about said second value as a conditional response to a determination that a fractional change of a scalar component of said first value has a magnitude greater than a notification threshold, wherein said notification threshold is less than 50% of said scalar component of said first value.

17. The computer-implemented online directory management method of claim 7, wherein said automatically transmitting said second value also described by said first alphanumeric label as said true mutation of said first value as said conditional response to correlating said newest value with at least said human behavior data from said first and second browser client devices after said first, second, and third browser client devices have received said first alphanumeric label comprises:

correlating said second value with at least said human behavior data from said first and second devices by applying a mixture model to a portion of said human behavior data from said first, second, and third browser client devices; and automatically withholding a validation of said second value pending a confirmation from a particular entity as a conditional response to a determination that a fractional change of said first value has a magnitude greater than a withholding threshold that is at least 40% of said first value.

18. The computer-implemented online directory management method of claim 7, wherein said automatically transmitting said second value also described by said first alphanumeric label as said true mutation of said first value as said conditional response to correlating said newest value with at least said human behavior data from said first and second browser client devices after said first, second, and third browser client devices have received said first alphanumeric label comprises:

receiving a component of the human behavior data from the second browser client device only as a result of the behavior monitoring code 810 being executed in a browser of the second browser client device, wherein the behavior monitoring code is not maintained in any non-transitory storage medium of the second browser client device; and using the component of the human behavior data from the second browser client device at the one or more servers only after the behavior monitoring code is deleted from the second browser client device.

19. A computer-implemented online directory management system comprising:

transistor-based circuitry configured to receive at one or more servers directory data including a first value and a first alphanumeric label that describes said first value;

transistor-based circuitry configured to receive at said one or more servers human behavior data from first, second, and third browser client devices that have each received both behavior monitoring code and directory request data; and transistor-based circuitry configured to transmit a second value also described by said first alphanumeric label as a true mutation of said first value as an automatic and conditional response to correlating a newest value with at least said human behavior data from said first and second browser client devices after the first, second, and third browser client devices have received the first alphanumeric label, wherein the newest value is the second value, and wherein said first and second values are within an order of magnitude;

wherein (1) aggregating from a multitude of mutually autonomous visitor devices scalar data that includes a sequence of many scalar numbers each described by said first alphanumeric label and each having a respective timestamp, said sequence of many scalar numbers including said newest scalar number;

(2) eliminating one or more scalar numbers that are not equal to said newest scalar number from said sequence of many scalar numbers; and (3) accepting said newest scalar number of said remainder of said sequence as a conditional response to a determination that said newest scalar number signals a mutation having a likelihood greater than a likelihood threshold, wherein said newest scalar number is said second scalar number, wherein said newest scalar number is said second scalar number and wherein said first, second, and third browser client devices are among said multitude of mutually autonomous visitor devices.

* * * * *